United States Patent [19]

Gaon

[11] 3,775,573

[45] Nov. 27, 1973

[54] CONTACT STATUS SENSING ARRANGEMENT

[75] Inventor: David E. Gaon, Villa Park, Ill.

[73] Assignee: GTE Automatic Electric Laboratories Incorporated, Northlake, Ill.

[22] Filed: Oct. 2, 1972

[21] Appl. No.: 294,065

[52] U.S. Cl. .......... 179/175.23

[51] Int. Cl. .......... H04m 3/26

[58] Field of Search .......... 179/175.3, 175.25, 179/175.23, 175.20; 324/66, 51, 62 R; 340/253 R, 253 P

[56] References Cited

UNITED STATES PATENTS

| | | | |
|---|---|---|---|
| 3,623,142 | 11/1971 | Key | 324/66 |
| 3,604,860 | 9/1971 | Buchheit | 179/175.2 C |

*Primary Examiner*—William C. Cooper
*Assistant Examiner*—Douglas W. Olms
*Attorney*—K. Mullerheim et al.

[57] ABSTRACT

A contact closure sensing arrangement for use in an electronic telephone central office wherein the status of the contacts is sensed by applying voltages of opposite polarities to the two conductors leading to the contact pair. One of the two leads is then abruptly switched from the source of the one polarity to a second source via a Zener diode and a magnetic core. This operation provides a very steep wave front and consequently a sharp output pulse from the core. Also disclosed is an arrangement for preventing false indications to the sensing equipment by including circuitry to keep a current flowing in the cable conductors to the contacts.

10 Claims, 5 Drawing Figures

CONTACT STATUS SENSING ARRANGEMENT

BACKGROUND OF THE INVENTION

1. Field of the Invention

This invention relates generally to a telephone communication system, and more particularly to an arrangement for testing the status of contacts associated with equipment whose usage is to be metered.

2. Description of the Prior Art.

The basic requirement for automatic message accounting is to provide for the correct billing of customers using the communication facilities of the telephone industry.

The billing arrangements fall under the categories of automatic or semi-automatic. Automatic billing is when the customer station equipment is arranged for automatic number identification and the customer is making a normal direct distance dialed station-to-station sent paid call. If the office does not have local automatic message accounting equipment, the billing information is forwarded to either a class 4/5 office with centralized automatic message accounting or to an office equipped with Strowger automatic toll ticketing.

Semi-automatic billing requires the intervention of an operator to obtain the calling party directory number. This is described as operator number identification and occurs when the customer does not have automatic number identification or in cases the customer has it but still requires the assistance of the operator for special handling of his call such as in person-to-person, collect, special (credit cards and the like) or extended direct distance dialed calls.

In step-by-step offices, the automatic message accounting requirements are met by Strowger automatic toll ticketing equipment which serves individual revenue-making circuits, and therefore become an integral part of the circuit. An example of such a system may be seen in U.S. Pat. No. 3,019,295. In an electronic automatic exchange office, full use is made of the rapid processing capability of the central processing unit to provide several functions required for the handling of customer calls. An intermediate approach to this is described in U.S. Pat. No. 3,433,898 where an electronic central control is combined with contact arrays to monitor the metered equipment.

Of the functions involved, one is to command the ticketing scanner unit of the office's local automatic message accounting equipment, under the direction of stored software programs, to interrogate, retrieve and return the present state of utilization of the trunk circuits or junctors. Another function is to cause the recording of the processed call's billing information in the ticketing store.

As in all digital systems, the information is represented in the presence or absence of a signal. In an electrical digital system two means are available for designers to establish the information in a signal. These are current sensing and voltage sensing. With current sensing the information is the presence of a current through a circuit limb. This necessitates the use of electro-magnetic components such as cores to detect the presence of a current. With voltage sensing the information is the presence of a potential across two nodes. This necessitates the use of voltage sensitive devices. It is common knowledge that there is a large amount of electro-magnetic noise in a telephone office which is generated by the switching of coils for the establishment of metallic paths between the inlets and outlets. It is therefore necessary that the signal-to-noise ratio in the information be large enough so that any sensing equipment be tolerant to the noisy environment. The scanner of this disclosure utilizes the current sensing mode, since for a fixed potential power supply system, a large current limited only by the capacity of the power supply and the switching circuit, can be made to represent the presence of the signal. Therefore a large S/N ratio can be more readily achieved.

In the local automatic message accounting scanning device, the contact matrix to be scanned is remote and attached to the scanning device via long cables.

It was found that the cable capacitances were such that the charge stored on them caused a current to flow on adjacent cables connected to a closed contact and thus indicating an erroneous closed current path when in fact the interrogated contact was open. This is particularly evidenced when the adjacent cables are left floating.

Further, since the output pulse is sensed through a transformer it was desirable to enhance the output of the transformer used in the determination of closed paths. This is normally accomplished by increasing the inductance presented to the drive pulse by increasing the number of turns of the transformer. However in electronic systems the packaging limitations prevent the use of this approach.

SUMMARY OF THE INVENTION

Accordingly it is an object of the present invention to improve the reliability of a contact matrix scanning device by enhancing the output of the toroidal transformer used in the determination of closed paths by the proper sequencing of the circuits.

it is a further object of this invention to reduce the effects of cable capacitance to improve the reliability of the contact matrix.

BRIEF DESCRIPTION OF THE DRAWING

The above mentioned objects and other features of the invention and the manner of obtaining them will become more apparent, and the invention itself will be best understood by reference to the following description of an embodiment of the invention taken in conjunction with the accompanying drawings in which.

DESCRIPTION OF THE PREFERRED EMBODIMENT

Figure 1:
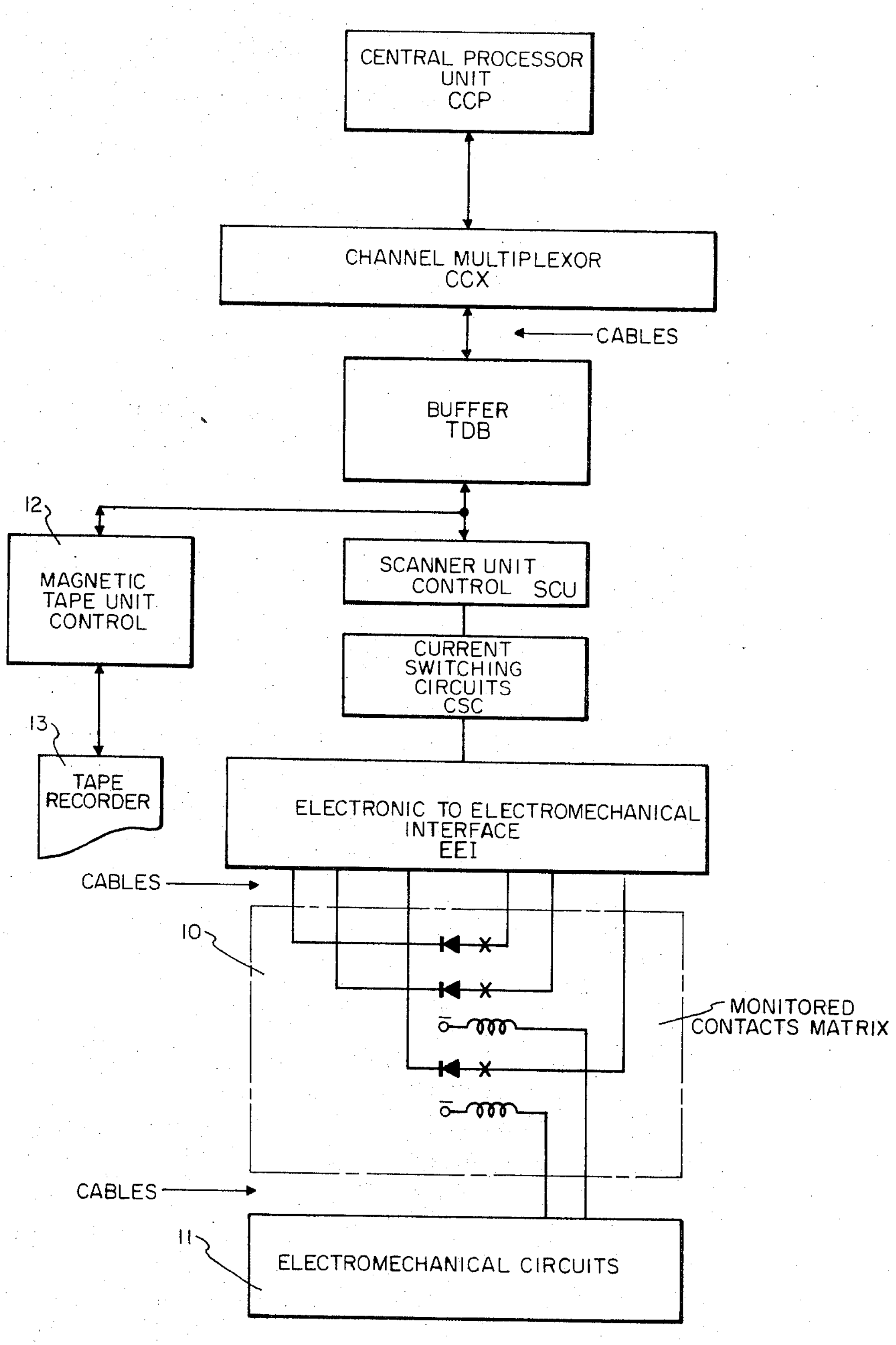
FIG. 1 shows in block diagram form the functional circuit configuration of a local automatic message accounting system for use in an electronic exchange.

The equipment herein disclosed may be used in a Processor Controlled Communication Switching System such as disclosed in U.S. Pat. Application Ser. No. 130,133 now abandoned filed Apr. 1, 1971 by K. E. Prescher, R. E. Schauer and F. B. Sikorski and also in that disclosed in U.S. Pat. Application Ser. No. 201,851 filed Nov. 24, 1971 by S. E. Puccini for a Data Processor with Cyclic Sequential Access to Multiplexed Logic and Memory. *The Local Automatic Message Accounting Equipment.* The organization of the local automatic message accounting equipment in an electron office is shown in FIG. 1.

This equipment consists of the central processor CCP of the telephone exchange, the access means to the processor shown as an input-output channel multiplex or CCX, the local automatic metering equipment input-output buffer TDB, the scanner unit control SCU, the current switching circuits CSC, the electronic-to-electromechanical interface EE1, the monitored contacts matrix 10, and the electromechanical circuits of the telephone exchange whose usage is being metered such as the trunk, originating junctors and incoming trunks shown by box 11. Also shown is a magnetic tape unit control 12 and a magnetic tape recorder 13 for the storage of the data accumulated.

The Scanner

This is comprised of the following basic circuits: the monitored contacts matrix and the electronics.

The Monitored Circuits

In a class 5 electronic office, the circuits monitored for billing purposes are:

1. Outgoing Trunks (OT) Circuits

Billing on OT circuits is done on the basis of utilization of the circuit, i.e., on how long the circuit was used by the customer and therefore the timing of the utilization is important.

2. Originating Junctor (OJ) Circuits

Billing on OJ circuits is done on the basis of the rate of usage of the circuit, i.e., jow often the circuit was used by the customer during his billing period and therefore calls on OJ's are pegged or counted for message rate service.

3. Incoming Trunks (IT) Circuits

These circuits are also monitored, but the purpose here is traffic observation rather than billing. An example for the requirement of traffic observation is for the determination of the revenue shares between operating companies using one another's facilities. Here again the circuits are monitored for the rate of usage.

In the case of OT's, three states of the circuit require accurate definition:

1. The answer state — when both the calling and the called called parties are connected by the switching path. This is when timing of the utilization begins.
2. The partial disconnect state — when either party only is disconnected but the switching path is still connected for use. This state is exemplified by the called party returning his receiver on hook to pick up the receiver of an extension in his home. For this customer convenience, the operating companies provide a 15 second (on the average) hold on the switching path beyond which it will automatically collapse. Billing should be discontinued at the partial disconnect state unless the switching path is re-ceased within the time limitations of the circuit.
3. The true (or final) disconnect state — when both the calling and the called parties have returned their receivers on hook and ceased using the switching path. This is when timing of the utilization ceases. Because three states of the OT circuits require accurate definition, two relay contacts are used to define them. One contact reflects the utilization of the calling party and the other that of the called party. These contacts are called the Hold and Answer contacts of the OT circuit.

In the case of the OJ's and IT's, only one contact reflecting the answer state of the switching path is required since the originating cutomer is charged a flat rate once every time he uses the circuit regardless how long he holds the path.

The Monitored Contacts Matrix

The hold and answer contacts are functions provided by the OT and OJ circuits. They therefore form part of the space divided equipment of an electronic exchange office. As the same implies, the space divided equipment is by nature engineerable, i.e., will depend on the office configuration and will grow as the traffic capacity of the office is increased.

This space divided nature was found to be a limitation in the engineering of the scanner insofar as direct cabling to the answer and hold contacts could not be achieved without great difficulty and waste of cabling material.

One can visualize the impact of redefining the function of a trunk circuit from day to day as the office changes configuration.

It is therefore apparent that a circuit which would repeat and centralize the hold and answer functions of the space divided equipment is required. This centralization would make possible a direct and fixed pattern cabling between the scanner and the scanned circuits while allowing the cabling between the space divided equipment and the repeating circuits to be unrestricted and unordered if necessary.

This repeating function is achieved by the repeating frames. These frames contain correeds with "make" contact configurations and the coils are driven directly by the hold and answer functions of the space divided equipment.

Figure 4:
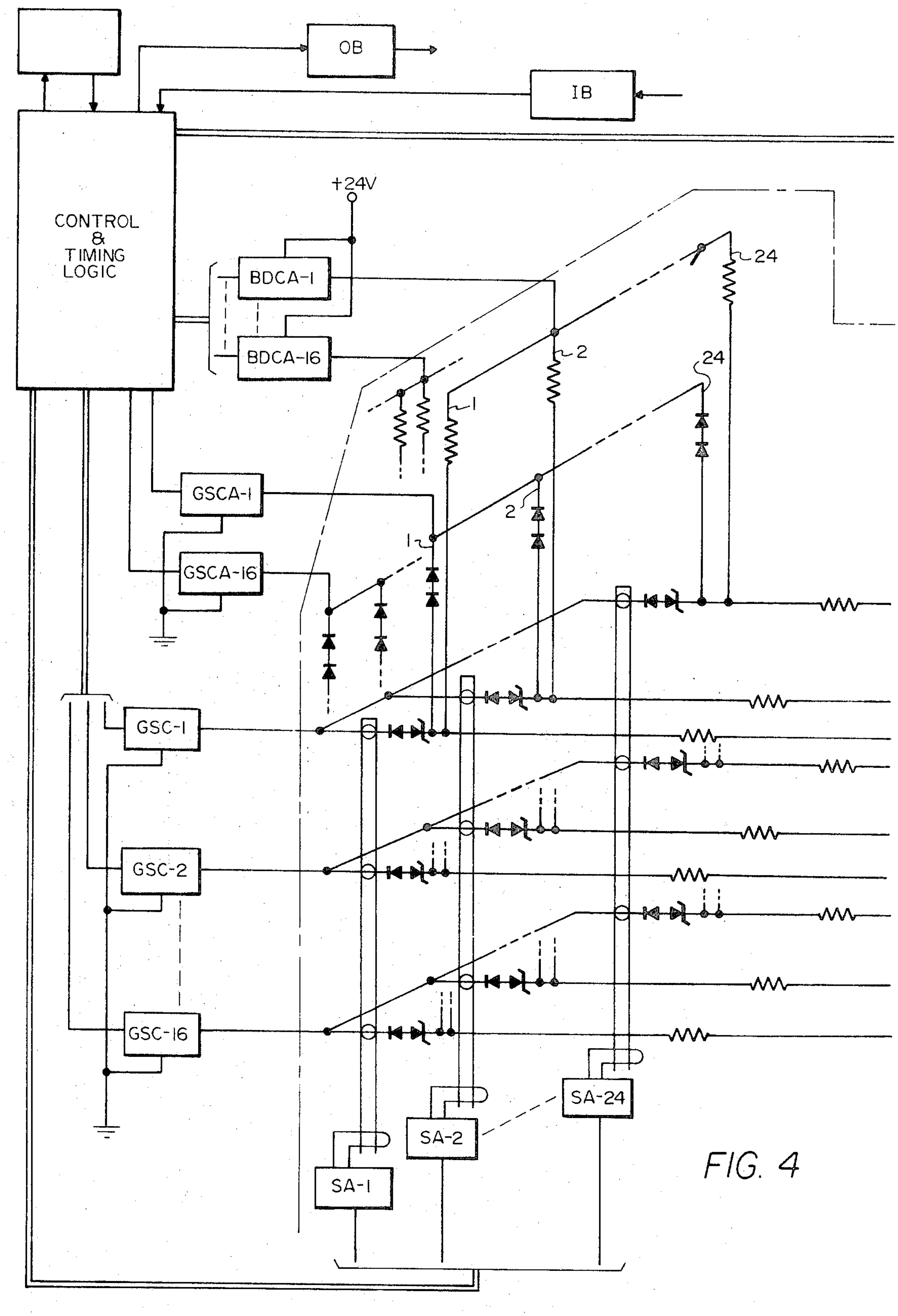
FIGS. 4 and 5 are a schematic of the contact matrix with the associated electronic circuits.
Figure 5:
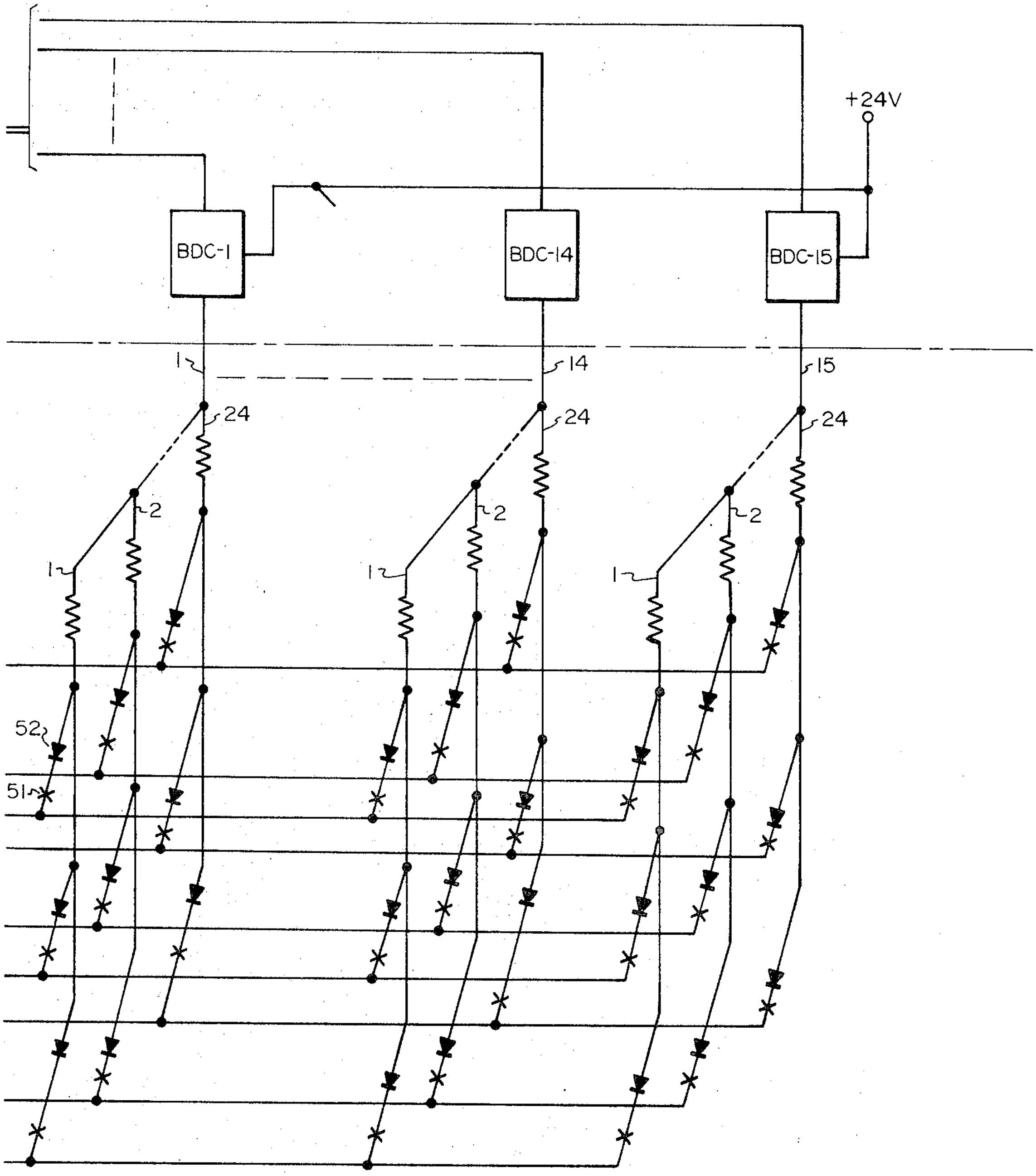

The use of the repeating frames not only provides the cabling advantages mentioned but also provides a beneficial separation between the scanner and the equipment which is electromagnetic in nature and carries high voltages. It also allows the organization of the correed contacts into a three dimensional matrix as shown in FIGS. 4 and 5 rather than the usual two dimensions used by the scanning equipment of other systems. This matrix arrangement further reduces the cabling between the scanner and the repeating frames and minimizes the number of current switching circuits.

The contact matrix is shown in FIGS. 4 and 5. The diodes such as for example 52 in series with each contact 51 are for isolation. This is necessary because of the multiple interconnection of the contacts to the same current switch BDC01.

One convenient dimension for the matrix is the computer word length. Since this is 24 bits long, it is logical that the scanner interrogates and retrieves the status of 24 contacts at a time via the 24 sense amplifiers SA1 through SA24. The other dimensions are obtained by minimizing the number of current switching circuits required to provide the sensing current. These are 15 current sources BDC1 through BDC15 and 16 current sinks GSCA1 through GSCA15 and GSC1 through GSC16 thus forming 16 planes of 24 × 15 contacts.

Therefore the maximum number of contacts that can be scanned is 24×15×16 or 5,670 contacts.

The Electronics

This comprises the current switching circuits, their control and timing logic and the device buffers which are general interface circuits between the central processing unit equipment such as the scanner.

Detailed description of the many separate functions in the electronics will be laborious and out of place. Instead, the basic operation and interaction of the circuits will be described as the scanning of one group of 24 contacts progresses.

Figure 2:
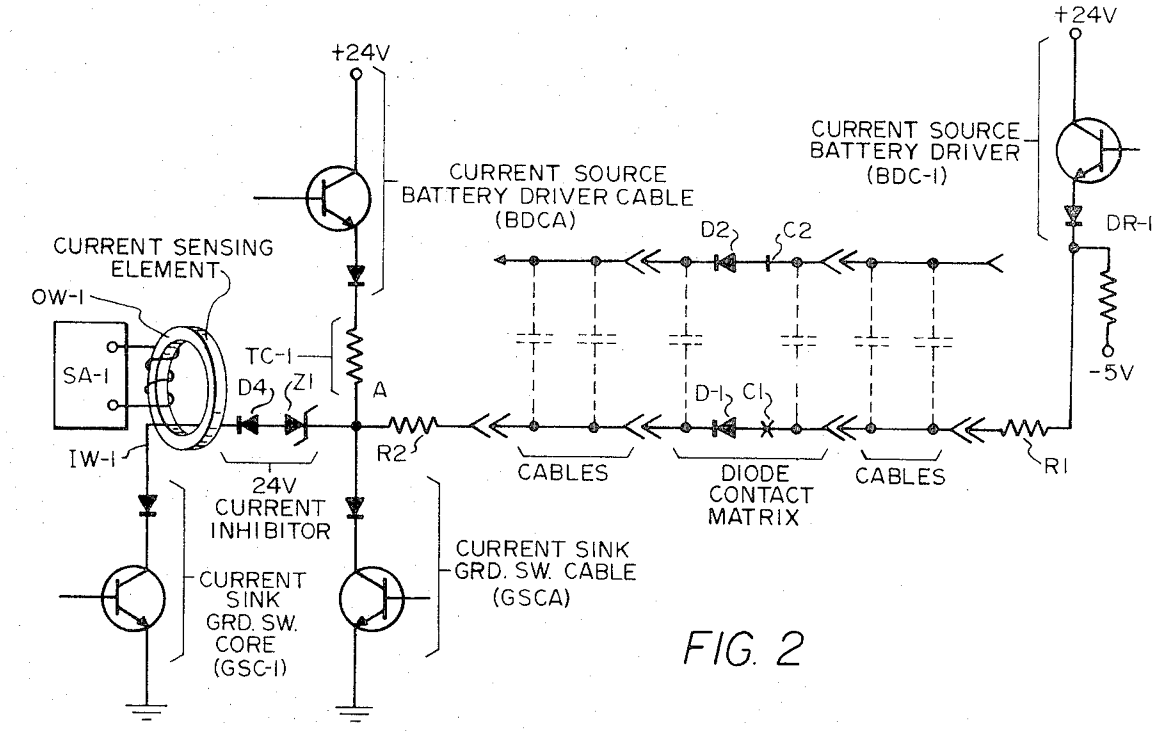
FIG. 2 is a line drawing of a single scan point ane associated circuitry illustrating the principle of the invention concept.

The basic scanning circuit, FIG. 2, can be described as a current source switch BDC1 feeding the contacts and a current sink switch GSC1 that allows the current to flow through the toroidal core sensing elements TC1. These cores TC1 operate as current transformers with many single turn input windings IW1 and an output winding OW1 which is used by a channel of electronics shown as the sense amplifier SA1.

When long cables between the contacts in the repeating frames and the scanning electronics were left floating, it was found that the conductors connecting a closed contact C2 adjacent to the conductors connecting an open contact C1 to be interrogated caused a large current change to be carried through the closed contact C2 into the core lead of the open contact C1. This gave an erroneous indication that the scanned contact was closed when it actually was not.

This problem was overcome by keeping the core end of all cables positively charged with battery drive cable charging circuits BDCA and the current source end of the cables negatively charged by using discharge resistors DR1 at the battery driver core circuits BDC1.

Figure 3:
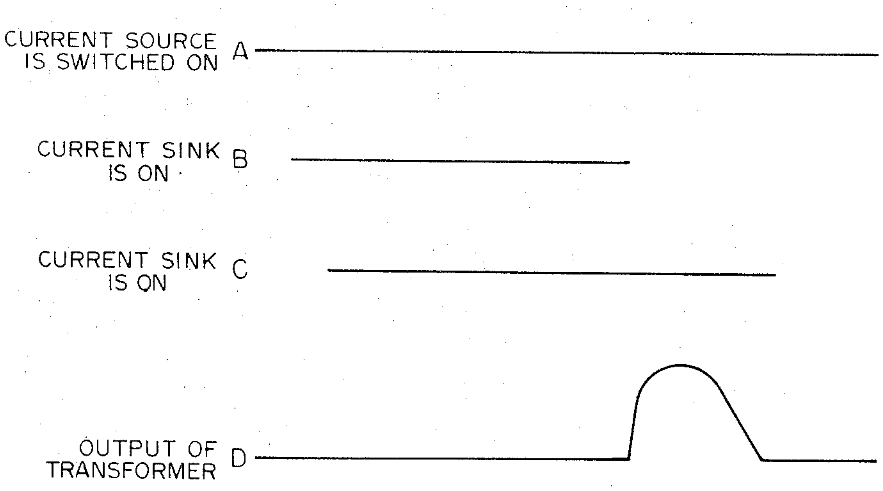
FIG. 3 is a chart showing the relative timing of the circuits of FIG. 2.

This new configuration is shown in FIG. 2 and will now be used with the time chart, FIG. 3 to describe the scan operation.

Scan operation

This begins by the ticketing program of the telephone central office getting control of the central processing unit. On execution, the program will issue a select instruction or directive which specifies which scanner channel is to perform the scan and effectively commands that scanner to set itself up for a scan operation.

This done, the program will then send the selected scanner the address of the group of 24 contacts it wishes to monitor. On receipt of this data, the scanner will start its scan operation as follows:

It will decode the address given, select and switch specific circuits such that:

A. only one current source battery driver core BDC1 circuit is switch ON; Line A of FIG. 3;

B. only one current sink ground switch cable GSCA1 circuit is switched ON; Line B of FIG. 3; and C. only one cable charger battery driver cable BDCA1 circuit is switched OFF.

The current path at this time is from the battery driver current source BDC1 through the contacts C1 and to the ground switch cable current sink GSCA1.

The selected core current sink ground switch core GSC1 is then switched ON providing a possible path for the contact current to flow through the cores. But no such current will flow since the GSCA1 is still switched ON and thus the potential at node A is lower than that required for the current inhibitor, the 2.4V Zener diode Z1, to conduct. Line C of FIG. 3.

The GSCA is then turned OFF. Line C of FIG. 3.

As the potential at node A rises above the Zener knee, the contact current path will suddenly switch from the GSCA1 limb to the GSC1 limb and a current pulse with a sharp rise time will flow through the cores.

As we know the transformer output voltage is given in simplified form by the expression:

$$V = L(di/dt)$$

The above sequence of circuit switching provides a high rate of change of current and therefore a better voltage output. Needless to say that the current will flow through the core only if the monitored contact is closed and its series isolation diode D1 is not open circuited. Line D of FIG. 3.

Shortly after the ground switch cable current sink GSCA1 is turned OFF, the transformer output is sampled and the results of that scan on a group of 24 contacts are stored in a register for later transmission to the program.

At this point in the scan cycle one of two sequences can occur:

A. If any error was registered during the scan, the cycle is terminated and an error condition is reported to the program. The program will take corrective action by reconfiguring to the other scanner unit, scheduling appropriate diagnostic program to localize the fault on the bad unit and try to scan with the new unit.

B. If there has been no error registered during the scan, then the cycle will continue by informing the program, through a READY signal, that the data retrieved is now present in its buffer. The program will collect that data and analyse its contents for closure of the monitored contacts.

At the end of the scan cycle, the scanner will clear itself in preparation for another cycle. What is claimed is:

1. A system for monitoring the condition of a circuit to determine with respect to said circuit whether it is open or closed, said system comprising in combination: a contact pair to be tested, a current source connected to a first contact of said contact pair, a first current sink connected to a second contact of said contact pair, a steering diode having one end connected to said second contact of said contact pair, a transformer having a core and a first and a second winding, a second current sink, said first winding connected between said steering diode other end and said second current sink, and a sequencing control operative to first enable said current source, said first and said second current sinks, to cause a current to flow from said current source to said first current sink, and secondly to disable said first current sink after an interval of time, said steering diode and said first winding thereafter operative to pass a current to said second current sink, to generate an output pulse across said second winding upon said contact pair being closed.

2. A system for monitoring as claimed in claim 1 wherein said steering diode is of a zener type.

3. A system for monitoring as claimed in claim 2 further including a pair of diodes wherein said diodes are in series between said first and second current sinks and said second contact of said contact pair, whereby only a single polarity current passes therethrough.

4. A system for monitoring as claimed in claim 3 further including a pair of resistors wherein one said resistor is in series between said current source and said first contact of said contact pair, and a second resistor of said pair of resistors is connected between said current sink and diode and said second contact of said contact pair, whereby the current passing therethrough is limited.

5. A system for monitoring as claimed in claim 4 further including a second current source connected to said second contact of said contact pair, and a third resistor connected between said first contact and a source of negative potential, said sequencing control operative to keep said second current source enabled prior to enabling said first current source, whereby said contacts and associated resistor and diode are biased in an opposing direction to suppress transients.

6. A system for monitoring the conditions of a plurality of circuits to determine with respect to each said circuit whether it is open or closed, said system comprising in combination; a plurality of contact pairs to be tested, each pair including first and second contacts, a corresponding plurality of first and second conductors, a current source connected to each said first contact of said contact pairs via said corresponding first conductors, a corresponding plurality of first current sinks connected respectively to each of said second contacts of said contact pairs via said corresponding second conductors, a corresponding plurality of steering diodes having one end connected to said respective corresponding second contact of each said contact pairs, via said corresponding second conductors, a corresponding plurality of transformers each having a core and a first and a second winding, a corresponding plurality of second current sinks, said first winding connected between said respective steering diode other end and a respective one of said second current sinks, and an allotting control, and a sequencing control, said sequencing control operative to first enable said current source and a first of said first and said second current sinks, to cause a current to flow from said current source to said first current sink, and secondly to disable said first current sink after an interval of time, said steering diode and said first winding thereafter operative to pass a current to said second current sink, to generate an output pulse across said second winding upon said contact pair being closed, said allotting control thereafter operated with said sequencing control to enable a second sequencing control operation with a second of said plurality of said contacts.

7. A system for monitoring as claimed in claim 6 wherein said steering diode is of a Zener type.

8. A system for monitoring as claimed in claim 7 further including a plurality of pairs of diodes wherein one of said pair of diodes is in series between said current source and said first contact of said contact pairs, and between the other of said pair of diodes said first and second current sinks and said second contacts of said contact pairs, whereby only a single polarity current passes therethrough.

9. A system for monitoring as claimed in claim 8 further including a plurality of pairs of resistors, wherein one of said resistor is in series with each said current source and said first contact of said contact pair, and a second resistor of said pair of resistors is connected between respective ones of said first and second current sinks and said second contacts of said contact pair, whereby the current passing therethrough is limited.

10. A system for monitoring as claimed in claim 9 further including a plurality of second current sources connected to said second contacts of said contact pairs, and a plurality of third resistors respectively connected between said first contacts and a source of negative potential, said sequencing control operative to keep said second current sources enabled prior to enabling said first current source, whereby said contact pairs and said pairs of resistors and said pairs of diodes are biased in an opposing direction to suppress transients.

* * * * *

UNITED STATES PATENT OFFICE
CERTIFICATE OF CORRECTION

Patent No. 3,775,573 Dated November 27, 1973

Inventor(s) DAVID E. GAON

It is certified that error appears in the above-identified patent and that said Letters Patent are hereby corrected as shown below:

Column 8, line 16, delete "between"

same line, after "diodes" add -- between --

Signed and sealed this 23rd day of April 1974.

(SEAL)
Attest:

EDWARD M.FLETCHER,JR.
Attesting Officer

C. MARSHALL DANN
Commissioner of Patents

UNITED STATES PATENT AND TRADEMARK OFFICE

Certificate

Patent No. 3,775,573 Patented November 27, 1973

David E. Gaon

Application having been made by David E. Gaon, the inventor named in the patent above identified and GTE Automatic Electric Laboratories Incorporated, Northlake, Ill., a corporation of Delaware, the assignee, for the issuance of a certificate under the provisions of Title 35, Section 256, of the United States Code, adding the name of Martin R. Winandy as a joint inventor, and a showing and proof of facts satisfying the requirements of the said section having been submitted, it is this 21st day of October 1975, certified that the name of the said Martin R. Winandy is hereby added to the said patent as a joint inventor with the said David E. Gaon.

FRED W. SHERLING,
*Associate Solicitor.*